United States Patent
Tumuluri (10) Patent No.: US 11,942,075 B2
(45) Date of Patent: Mar. 26, 2024

(54) SYSTEM AND METHOD FOR AUTOMATED DIGITAL TWIN BEHAVIOR MODELING FOR MULTIMODAL CONVERSATIONS

(71) Applicant: Openstream Inc., Somerset, NJ (US)

(72) Inventor: Rajasekhar Tumuluri, Bridgewater, NJ (US)

(73) Assignee: Openstream Inc., Bridgewater, NJ (US)

(*) Notice: Subject to any disclaimer, the term of this patent is extended or adjusted under 35 U.S.C. 154(b) by 388 days.

(21) Appl. No.: 17/483,882

(22) Filed: Sep. 24, 2021

(65) Prior Publication Data
US 2023/0099393 A1 Mar. 30, 2023

(51) Int. Cl.
| | |
|---|---|
| G10L 15/06 | (2013.01) |
| G06N 10/00 | (2022.01) |
| G10L 15/18 | (2013.01) |
| G10L 15/25 | (2013.01) |
| G10L 15/30 | (2013.01) |

(52) U.S. Cl.
CPC ............ *G10L 15/063* (2013.01); *G06N 10/00* (2019.01); *G10L 15/1815* (2013.01); *G10L 15/1822* (2013.01); *G10L 15/25* (2013.01); *G10L 15/30* (2013.01)

(58) Field of Classification Search
CPC ............ G10L 15/063; G10L 15/1815; G10L 15/1822; G10L 15/25; G10L 15/30; G06N 10/09
USPC .................................................. 704/231
See application file for complete search history.

(56) References Cited

U.S. PATENT DOCUMENTS

| | | | |
|---|---|---|---|
| 10,079,029 B2 | 9/2018 | Amini et al. | |
| 11,314,941 B2* | 4/2022 | Aly | G06F 3/013 |
| 11,443,120 B2* | 9/2022 | Poddar | G06F 40/216 |
| 11,688,022 B2* | 6/2023 | Aghajanyan | G06F 40/242 |
| | | | 704/9 |
| 11,694,281 B1* | 7/2023 | Liu | G06F 40/205 |
| | | | 704/9 |
| 2022/0188361 A1* | 6/2022 | Botros | G02B 27/01 |

* cited by examiner

*Primary Examiner* — Susan I McFadden
(74) *Attorney, Agent, or Firm* — Young Basile Hanlon & MacFarlane, P.C.

(57) ABSTRACT

Methods and systems for a multimodal conversational system are described. A method for interactive multimodal conversation includes parsing multimodal conversation from a physical human for content, recognizing and sensing one or more multimodal content from the parsed content, identifying verbal and non-verbal behavior of the physical human from the one or more multimodal content, generating learned patterns from the identified verbal and non-verbal behavior of the physical human, training a multimodal dialog manager with and using the learned patterns to provide responses to end-user multimodal conversations and queries, and training a virtual human clone of the physical human with interactive verbal and non-verbal behaviors of the physical human, wherein appropriate interactive verbal and non-verbal behaviors are provided by the virtual human clone when providing the responses to the end-user multimodal conversations and queries.

12 Claims, 11 Drawing Sheets

SYSTEM AND METHOD FOR AUTOMATED DIGITAL TWIN BEHAVIOR MODELING FOR MULTIMODAL CONVERSATIONS

FIELD OF INVENTION

This disclosure relates to human-computer interactions. More particularly, this disclosure relates to a system and method for providing digital twin responses in a multimodal conversation environment comprising multimodal interactions between a user and a human agent or a virtual human agent or client.

BACKGROUND

Face-to-face conversations between humans involves dialog management where speakers see each other and communicate. Such face-to-face communications are more effective and meaningful as the speakers communicate by interpreting the intent, facial expressions, and body language of the other person's behavior and signals. On the other hand, human-computer interactions involve communication between a user and a virtual (software) agent. These virtual agents may have the capability of responding to the user's utterance by analyzing verbal and non-verbal behavior of users. However, the knowledge that is learned by the virtual agent is limited. There is therefore a need to bring a human agent into the loop to have a meaningful conversation, and when applicable, continue the conversation by handing over the control back to the virtual agent.

SUMMARY

In an aspect, a method for interactive multimodal conversation includes parsing multimodal conversation from a physical human for content, recognizing and sensing one or more multimodal content from the parsed content, identifying verbal and non-verbal behavior of the physical human from the one or more multimodal content, generating learned patterns from the identified verbal and non-verbal behavior of the physical human, training a multimodal dialog manager with and using the learned patterns to provide responses to end-user multimodal conversations and queries, and training a virtual human clone of the physical human with interactive verbal and non-verbal behaviors of the physical human, wherein appropriate interactive verbal and non-verbal behaviors are provided by the virtual human clone when providing the responses to the end-user multimodal conversations and queries.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which.

DETAILED DESCRIPTION

A system and method for multimodal conversational system is disclosed which enables seamless transitions between a human agent and a conversational agent, where the term conversational agent can be interchanged with or refer to a virtual agent, a trained virtual human agent, a trained virtual human clone, or a virtual twin. The conversational agent is a virtual human clone. A clone of a real human trained to resemble the human as described herein. The human agent (physical human) and the virtual human clone serve as a digital twin in a or for a multimodal conversational system. In an implementation, a method and associated system includes capturing one or more of a user's utterances using one or more multimodal inputs. The system can recognize the multimodal content and determine the social and functional attentional elements. The method can initiate responses to the user input with the virtual human clone and transfer the conversation to the human agent when an attention shift calls or requires the human agent. Users receive responses seamlessly from the human agent or the virtual human clone. That is, a digital twin environment is provided, where interactions shift between the human (user)-human (expert) and human (user)-computer (virtual agent) as and when the need arises during the conversation.

The digital twin environment uses virtual reality to replicate the equipment, components, and other criteria and is used to address different aspects such as monitoring engineering systems and determining malfunctioning equipment. In this embodiment, a digital twin replicates the virtual agents as humans wherever required in a multimodal conversational environment.

Digital twin technology mimics a physical entity to ensure an exact match of the physical entity characteristics, thus providing an opportunity to stimulate and conduct an experiment. Digital replicas of intangible objects provide innumerable possibilities to understand, alter, and examine alternatives. Hence resemblance and behavioral similitude are natural corollaries that provide the current science a platform to inquire into behavioral aspects and extract the best possible outcomes. Aerospace engineering, wind farming, urban infrastructure mapping, and countless many applications in various fields can exploit digital twin technologies.

With the advent of smarter devices, question-answer systems have seen a growth in the usage of multimodality. The accuracies of speech-to-text conversion engines have transcended their initial limitations, and the state-of-the-art systems have proved to be more conducive to support on-the-go voice enablement. The industry has moved from dumb voice assistants based on metallic voices to imitating smooth and more human like voices. This transition from voice supported systems to intelligent speech assisted agents has been powered by advanced speech synthesis engines. While the trend to improve these voice-based systems has been continuing, a parallel field of human-computer interface to provide a more human like interaction with the computer has emerged, the concept of digital avatars. These meta-humans provide a complete human like presence with the avatar and the human behind the avatar reflecting each other in near real-time. Digital avatars, with their human like presence, using meta humans and metallic voices provide a more human like interaction. These digital twins of human beings have been fraught with many problems, such as lip-syncing, syncing of facial expressions, hand-eye coordination, smart body movements and motion, and the like, as there is no bidirectional communication between the avatar and the human.

The system and method described herein, including the digital twin environment, can enable an entanglement of the human and virtual human clone to make an avatar (virtual human clone) look natural and permit interchanging between the human and the virtual human clone seamlessly whenever there is an attention shift in the multimodal conversation. For instance, the system provides a human interface which is supplemented by the virtual human clone, and methods which provide an exact or substantially exact match of the human with respect to the complexities involved such as body language, mimicking the exact facial expressions, diction, dialect, modulation, voice quality, resemblance, lip movement, nodding, and the like.

An automated digital twin behavior model is disclosed which enables preparation of responses to user utterances in a conversation that includes one or more multimodality content. The system analyzes the multimodal interactions, determines the need of a human in the loop, and replaces the virtual human seamlessly during the conversation without the user noticing the substitution. The system uses natural language processing, computer vision, speech processing, deep quantum learning, and virtual reality techniques to train the virtual human clone, analyze the multimodal query, and prepare an appropriate response to the user query. The method uses pre-trained probabilistic models learned by deep learning models like Variational Auto Encoders (VAE) that are trained on speech segments of humans to train a plurality of sequence language models. The speech is synthesized using latent features learned with VAE and learned representations in a stochastic low dimensional latent representation space.

The digital twin environment generates a virtual human clone of a human using virtual reality techniques in a controlled environment and trains the virtual human clone by learning verbal and non-verbal behavioral patterns of a human. The input utterance in a multimodal conversation includes one or many modes of visual, verbal, or vocal. The system as described herein can understand the multimodal content in the utterance and analyzes the responses provided by a virtual human clone. The system can trigger a human to respond to the user's query when the virtual human clone is not in the position to respond due to its limited knowledge. An example conversation between a doctor and a teleconsultation patient is shown in Table 1 below:

TABLE 1

| Example Conversation |
| --- |
| Patient: Hello |
| Agent (Virtual Doctor Clone): Hi good morning, how can I help you today? |
| Patient: I have been suffering from a headache for the past one week and I want some treatment for the same |
| Agent (Virtual Doctor Clone): I can help you with that, can I have your name and mobile number so that I can assist you better? Or show me your smart health card? |
| Patient: Shows smart health card. (Sure, my name is XYZ and my phone number is +10123456789) |
| Agent (Virtual Doctor Clone): Thanks, scanning your card, and hang on while I access your file |
| Patient: Sure |
| Agent (Virtual Doctor Clone): So XYZ, I see that you have a history of diabetes, do you have any symptoms other than a headache? |
| Patient: I also have a sore throat for the last couple of days |
| Agent(Virtual Doctor Clone): Have you had any tests done in the last few days? |
| Patient: Yes, I had my blood test and my cholesterol and BP are high |
| Agent(Virtual Doctor Clone): Can you share the test report? |
| Patient: Uploading the document by dragging and dropping through touch screen |
| Agent(Virtual Doctor Clone): Got it, please wait a minute |
| *Agent transfers chat history to a doctor* |
| Agent (doctor): Have you ever had a kidney function test? |
| Patient: No, do I have to? |
| Agent (doctor): Yes, there seems to be an issue with your kidneys and a kidney test would be best to diagnose it. Following are the locations where you can get the test done—(a) ABC, (b) BCD, (c) CDE |
| Patient: Can I get some medicine that can help me at least temporarily? |
| Agent (doctor): Sure, I have sent the prescription to your pharmacy on file to help you until your test report comes back and then we can consult again |
| Patient: Thank you |
| *Doctor transfers the control to a virtual doctor clone * |
| Agent (Virtual Doctor Clone): Do you want me to help you with your Kidney Functioning test appointment booking? |
| Patient: Yes, that would be wonderful |
| Agent (Virtual Doctor Clone): Which of the following location would work best for you (a) ABC, (b) BCD, (c) CDE? |

TABLE 1-continued

Example Conversation

Patient: BCD
Agent (Virtual Doctor Clone): We have the following slots available today—(a) 3:00 pm, (b) 4:00 pm, (c)6:00 pm
Patient: I want to book for tomorrow instead
Agent (Virtual Doctor Clone): Sure, following slots are available (a) 7:00 am, (b) 8:00 am, (c) 1:00 pm, (d) 2:00 pm, (e) 3:00 pm, (d) 4:00 pm, (e) 6:00 pm, (f) 7:00 pm, (g) 8:00 pm, (h) 9:00 pm
Patient: This option (e) works best for me // selects by touching the option on the screen
Agent(Virtual Doctor Clone): Sure, let me book the slot for you
Agent(Virtual Doctor Clone): Your booking ID is ABCDEFG. Your test result will be available in 24 hours after your test and we will automatically book a doctor's appointment after that.
Patient: OK
Agent(Virtual Doctor Clone): Is there anything else I can help you with?
Patient: Nothing else for now
Agent(Virtual Doctor Clone): Thank you and hope that you have a speedy recovery and a great day ahead!

The exemplary digital twin system can enable or provide a physical appearance as well as behavior to the virtual human clone, where the state of human behavior and virtual human clone behavior are entangled with each other as described herein. That is, the digital twin system can provide virtual manifestations of real human agents. The system can use supervised and unsupervised deep learning techniques to transfer the knowledge of a human expert to its virtual human clone through a series of social simulations, enhancing the digital twin behavior modeling experience. In an embodiment, the digital twin platform includes both model-based and data-driven methods.

Consider the multimodal conversation having N turns, $C=\{c_1, c_2, \ldots, c_N\}$ where each turn $c_i$ is one or more combinations of multimodal content (e.g., text, image, audio, etc.), and the number of hidden states is M. The dialogue is trained according to the objective function:

$$P_\theta(c_1, c_2, \ldots, c_N) = \Pi_{i=1}^{N} P_\theta(c_i | c_1, c_2, \ldots, c_{i-1})$$

where $\theta$ represents the model parameters. The hidden states of the model for $m \in M$ are defined as:

$$h_{i,m}^{text} = f_\theta^{text}(w_{i,m}, h_{i,m-1}^{text})$$

Entities in the multimodal content are represented as vector embeddings and processed by employing deep learning models. For instance, for each image $img_j$, $$(rep_{j,1}, rep_{j,2}, \ldots rep_{j,l}) = \text{ImageModel}(img_j)$$

where 'l' is the number of layers from which the image representation of 'j' is extracted. ImageModel can be any neural network architecture such as VGGNet, ResNet, or a custom-built neural network architecture. Since each representation may be of different dimensions, all representations are passed through a fully connected (FC) architecture to bring them to a uniform dimension as shown below:

$$U_{i,j} = FC(rep_{i,j})$$

Then, the semantically related multimodal entities (e.g., words/phrases in the text and object in an image) representations are concatenated before passing them to the context encoder:

$$Z_i = \text{concatenate}(h_{i,M}^{text}, U_i)$$

$$h_i^{cxt} = f_\theta^{cxt}(z_i, h_{i-1}^{cxt})$$

Next, the cross-modal multi-head attention with 'K' heads is applied by projecting the context encoder's hidden states to the 'K' semantically different spaces of the same input using learnable projection matrices. For $k^{th}$ head:

$$h_i^k = W_v^k \cdot h_i$$

where $W_v$ is the learnable projection matrix for the $k^{th}$ semantic space. Then, classic attention processing is performed on all the spaces to derive the 'K' attention probability distributions over the concatenated input. The 'K' distributions are used to generate 'K' context vectors that focus on different input components. Let $\alpha_{t,i}^k$ represent the attention weights over the $i^{th}$ context encoder hidden state $h_i^k$ at a time 't' and is defined as:

$$\alpha_{t,i}^k = \text{softmax}(h_i^k \cdot s_t)$$

where $s_t$ is the decoder's hidden state at the time 't'. The context vector is calculated as the weighted sum of encoder hidden states, $$c_k^t = \sum_{i=1}^{T} \alpha_{t,i}^k \cdot h_i^k$$

At each timestep during the decoding process, combine all the $c_k^t$ for word generation by using concatenation. The final context vector is calculated as, $$c_t^{final} = \sum_{k=1}^{K} \text{softmax}(W_q \cdot h_N) \cdot c_k^t$$

where $W_q$ is the query and is a trainable parameter. Finally, to generate words in the decoder recurrent neural network (RNN), we use:

$$s_t = f_\theta^{dec}(c_t^{final}, y_{t-1}, s_{t-1})$$

$$\text{Output} = \text{softmax}(y_{t-1}, s_t)$$

The probability values along with the intents provide the attention shift to transfer the control from virtual human clone to human and vice versa. The cross-modal multi-headed attention helps to model long-term dependencies. Moreover, multiple possible contexts can be captured by applying repeated attention to the same input captures. This also helps to provide better context shift and maintain longer conversations.

The method steps have been represented, wherever appropriate, by conventional symbols in the drawings. Specific details are provided which are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

Figure 1:
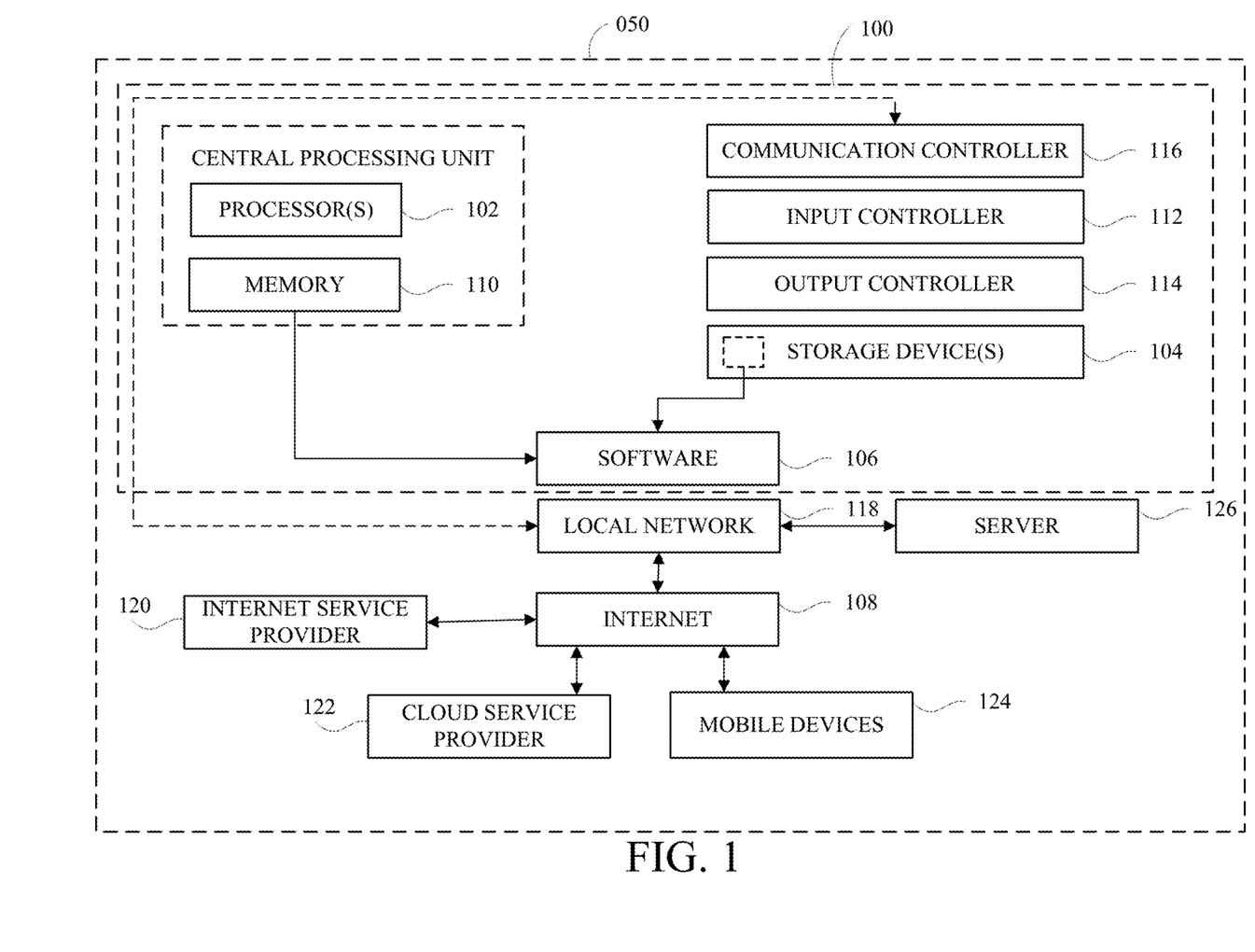
FIG. 1 is a block diagram of an example of a computing device in accordance with embodiments of this disclosure.

FIG. 1 is a block diagram of a system 050 that comprises a computing device 100 to which the present disclosure may be applied according to embodiments of the present disclosure. The computing device 100 includes at least one processor 102, designed to process instructions, for example computer readable instructions (i.e., code) stored on a storage device 104. By processing instructions, processor 102 may perform the steps and functions disclosed herein. Storage device 104 may be any type of storage device, for example, but not limited to an optical storage device, a magnetic storage device, a solid-state storage device, or a non-transitory storage device. The storage device 104 may contain software 106 which may include a set of instructions (i.e., code). Alternatively, instructions may be stored in one or more remote storage devices, for example storage devices accessed over a network 118 or the internet 108. The computing device 100 also includes an operating system and microinstruction code. The various processes and functions described herein may either be part of the microinstruction code, part of the program, or a combination thereof, which is executed via the operating system. Computing device 100 additionally may have memory 110, an input controller 112, and an output controller 114 and communication controller 116. A bus (not shown) may operatively couple components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device such that output controller 114 is configured to transform the display on display device (e.g., in response to modules executed). Examples of a display device include, and are not limited to a monitor, television, mobile device screen, or touch-display. Input controller 112 may be operatively coupled via a wired or wireless connection to an input device such as a mouse, keyboard, touch pad, scanner, scroll-ball, or touch-display, for example. The input device is configured to receive input from a user and transmit the received input to the computing device 100 vial the input controller 112. The communication controller 116 is coupled to a bus (not shown) and provides a two-way coupling through a network link to the internet 108 that is connected to a local network 118 and operated by an internet service provider (ISP) 120 which provides data communication services to the internet 108. A network link may provide data communication through one or more networks to other data devices. For example, a network link may provide a connection through local network 118 to a host computer, to data equipment operated by the ISP 120. A cloud service provider 122 and mobile devices 124 provide data store and transfer services to other devices through internet 108. A server 126 may transmit a requested code for an application through internet 108, ISP 120, local network 118 and communication controller 116. FIG. 1 illustrates computing device 100 with all components as separate devices for ease of identification only. Each of the components shown in FIG. 1 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be implemented as one or more servers, for example a farm of networked servers, a clustered server environment, or a cloud network of computing devices.

Figure 2:
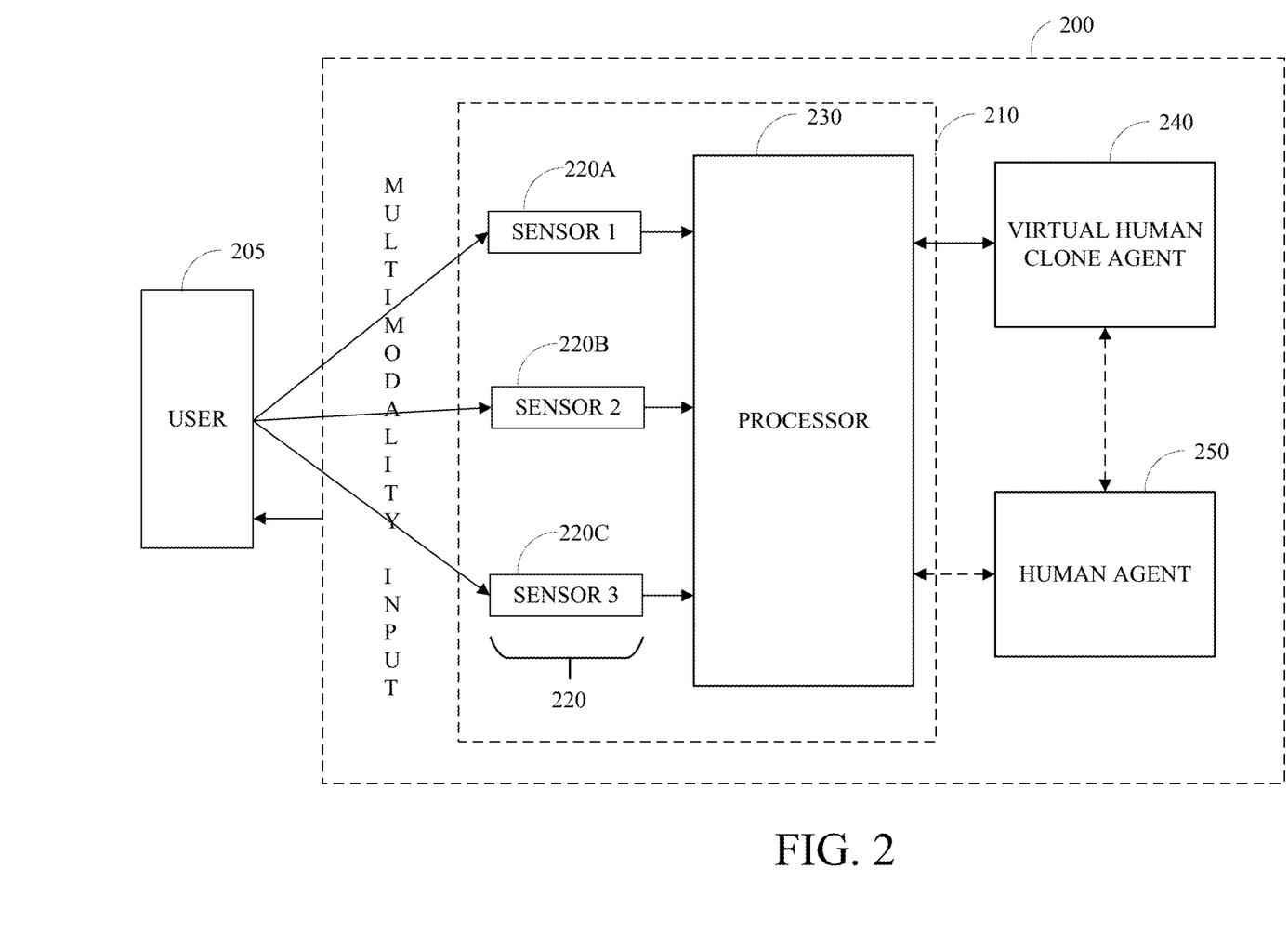
FIG. 2 is a block diagram of an example of a system in accordance with embodiments of this disclosure.

FIG. 2 is a block diagram of an example of a system 200 in accordance with embodiments of this disclosure. The system 200, for example, can implement a method of digital twin response for a multimodal utterance either by a human or a virtual human clone via a multimodal conversational virtual assistant tool 210. The multimodal conversational virtual assistant tool 210 can include or can be a multimodal processing component. The multimodal conversational virtual assistant tool 210 can be configured to allow users 205 to provide multimodality inputs via a multimodality interface 220, which can include, for example, one or more sensors 220A-220C. Any number of sensors may be implemented, and three sensors are shown in FIG. 2 for simplicity and clarity. The one or more sensors 220A-220C may be any type of sensor including, for example, an interactive touch display, a microphone, a global positioning system (GPS) sensor; an accelerometer, or a biometric sensor. In an example, sensor 220A may be a microphone, sensor 220B may be an interactive touch display, and sensor 220C may be an accelerometer.

The multimodality inputs may comprise free-form text input in the form of a question or a statement. Alternatively, or in addition to, the multimodality input may comprise an audio input such as speech or voice input, some other form of multimodality input such as an image, video, touch, scanned object, gesture, or any combination thereof. In an example, the multimodal conversational virtual assistant tool 210 may be configured to processes the multimodality input using a processor 230, which produces an output for use by a virtual human clone agent 240 or a human agent 250, as appropriate, and as described herein.

Figure 3:
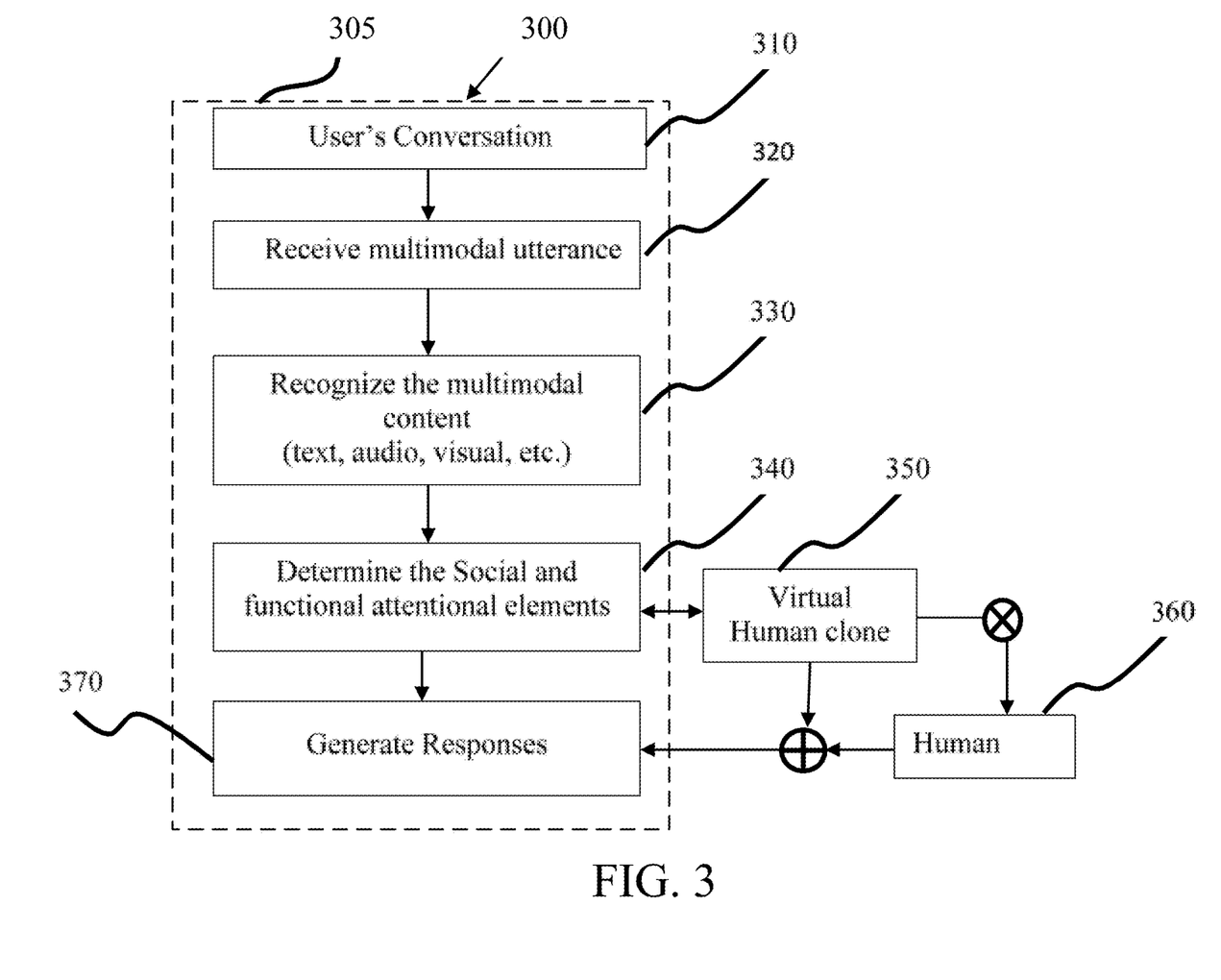
FIG. 3 is a flow diagram of an example conversation in accordance with embodiments of this disclosure.

FIG. 3 is a flow diagram of an example multimodal conversation flow 300 in accordance with embodiments of this disclosure. The multimodal conversation flow 300 is implemented between a multimodality interface and processor 305 (collectively "multimodality processor"), a virtual human clone 350 (in a trained mode), and a human 360. The multimodality processor 305 can receive a user's (e.g., end-user) conversation 310 with one or more multimodal utterances 320 as a set of inputs and analyze same. These inputs may be provided by the user through the multimodality interface, which can be a multimodal interface-based computer-implemented tool, for example. These inputs are, but not limited to, images, speech, audio, text, facial expressions, body language, touch, scanned object, and video. The multimodality processor 305 can recognize the multimodal content embedded in the conversation using natural language processing, speech processing, computer vision and machine learning techniques (330). The multimodality processor 305 can determine social and functional attentional elements in the content of a multimodal utterance by exploiting semantical relationships among the elements (340). The virtual human clone 350 can understand the intent of the query and generate responses 370 to the user. The virtual human clone 350 can also decide if the involvement of human 360 is needed to generate responses 370 by triggering attention shift events raised during the analysis of the one or more multimodal content in the input. That is, the responses 370 can be provided by the virtual human clone 350, the human 360, or combinations thereof.

Figure 4:
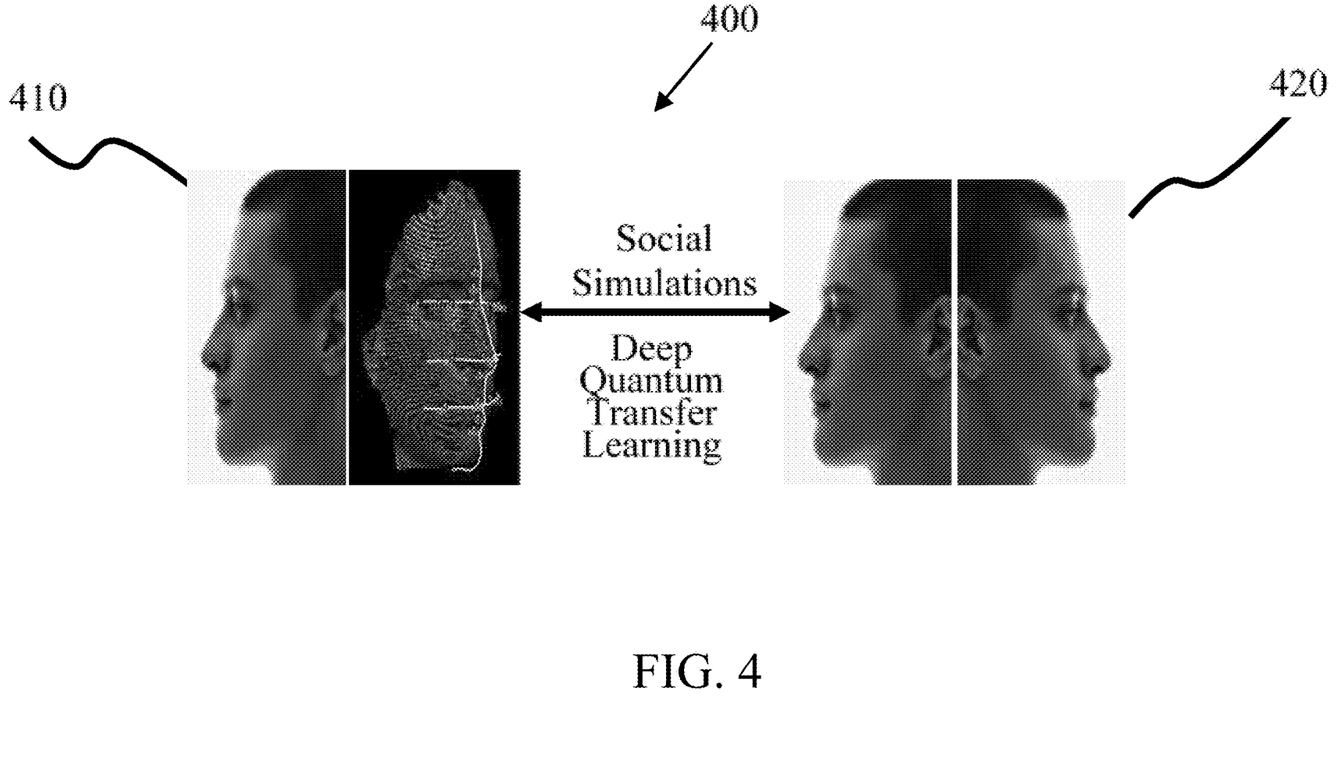
FIG. 4 is a diagram of an example digital twin behavior model in accordance with embodiments of this disclosure.

FIG. 4 is a diagram of an example digital twin behavior model 400 in accordance with embodiments of this disclosure. The digital twin behavior model 400 illustrates an untrained virtual human clone 410 and a trained virtual human clone 420 after transfer learning, which can use social simulations and quantum transfer learning. Transfer learning is shown, for example, in FIG. 5. The virtual human clone 410 learns the verbal and non-verbal behavioral patterns through social simulations and adapts the behavior of humans through deep quantum transfer learning to become the trained virtual human clone 420, which together with the human is collectively referred to as a digital twin.

In implementations, quantum teleportation, quantum entanglement, and teleport information can be used as between the human and the virtual human clone in quantum space so that virtual human clone behaves the same as human. Quantum entanglement describes the quantum states of both the human and virtual human clone with reference to each other. Quantum teleportation helps in transferring the conversational state (control) to either a human or virtual human clone, without communicating to the digital twin carrying the state. Quantum information difference is minimized as between human data points and his/her virtual human clone datapoints in quantum space so that both the human and the virtual human clone have a similar or same visual and behavioral perspective.

In quantum enable systems, the information is stored in quantum bits (or qubits). A qubit can exist in states labeled $|0\rangle$ and $|1\rangle$ as well as in superposition of these states, $a|0\rangle+b|1\rangle$. This state is a linear combination of $|0\rangle$ and $|1\rangle$, written as:

$$|\psi\rangle = \alpha|0\rangle + \beta|1\rangle.$$

where $\alpha$ and $\beta$ are complex numbers. The quantum states ($|\alpha\rangle$) are expressed using Dirac's bracket notation.

A qubit state that produces a value of 1 when measured and another that gives a value of 0 can be expressed in terms of mutually exclusive states (as column vectors) as shown below:

$$\begin{pmatrix}1\\0\end{pmatrix}=|0\rangle, \begin{pmatrix}0\\1\end{pmatrix}=|1\rangle$$

Two quantum systems are said to be entangled when the values of certain properties of one system are non-classically correlated with the values for another system. The quantum entanglement is represented by Bell states, which are quantum states linked to two qubits, as shown below:

$$|\beta_{xy}\rangle = \frac{|0x\rangle + (-1)^y|1\bar{x}\rangle}{\sqrt{2}}$$

where
x and y are phase bit and parity bit and $\in \{0, 1\}$, $\bar{x} = 1 \otimes x$, $\otimes$ denotes bitwise XOR Table 2 shows bell states for the different combinations of phase bit and parity bit:

In the present invention, both human (H) and the virtual human clone or

TABLE 2

| Combination | Representation |
|---|---|
| x = 1, y = 1 | $\|\beta_{11}\rangle = \frac{\|01\rangle - \|10\rangle}{\sqrt{2}}$ |
| x = 0, y = 0 | $\|\beta 00\rangle = \frac{\|00\rangle + \|11\rangle}{\sqrt{2}}$ |
| x = 0, y = 1 | $\|\beta 01\rangle = \frac{\|00\rangle - \|11\rangle}{\sqrt{2}}$ |
| x = 1, y = 0 | $\|\beta 10\rangle = \frac{\|01\rangle + \|10\rangle}{\sqrt{2}}$ | virtual/digitized twin (T) exist in a superposition quantum state, which is a linear combination of both H and T. This can be formulated as below:

$$|\psi\rangle = \alpha|H\rangle + \beta|T\rangle$$

Quantum teleportation establishes a communication channel between the virtual human and the virtual twin for exchanging information. Following are the steps to create the communication channel.

The teleportation protocol begins with a quantum state or qubit $|\psi\rangle$. Following that, the protocol needs human (H) and virtual twin (T) to be maximally entangled. This state is usually predetermined and will be among the following four bell states:

$$|\Phi_{HT}^+\rangle = \frac{|0\rangle_H \oplus |0\rangle_T + |1\rangle_H \oplus |1\rangle_T}{\sqrt{2}}$$

$$|\Psi_{HT}^+\rangle = \frac{|0\rangle_H \oplus |1\rangle_T + |1\rangle_H \oplus |0\rangle_T}{\sqrt{2}}$$

$$|\Psi_{HT}^-\rangle = \frac{|0\rangle_H \oplus |1\rangle_T - |1\rangle_H \oplus |0\rangle_T}{\sqrt{2}}$$

$$|\Phi_{HT}^-\rangle = \frac{|0\rangle_H \oplus |0\rangle_T - |1\rangle_H \oplus |1\rangle_T}{\sqrt{2}}$$

In the present disclosure, both the human and virtual twin share $|\phi^+_{HT}\rangle$ state. The human obtains one of the particles in the pair, with the other going to the virtual twin. At this point, a communication channel is established between the human and virtual twin, and the teleportation of data is possible between both the human and digital twin. The model is trained with user data (such as facial expression, gestures, paralinguistics, etc.) on a CPU-based system to determine the candidate model parameter set (ϕ). Once the required efficiency is observed, the candidate model parameters set (ϕ) and user training data are passed to the Quantum space. The model on the quantum space is executed on a Quantum Processing Unit (QPU), for example, which reads the candidate model parameter set, and training data passed from the CPU trained model. The quantum model can create both human and virtual twin of the user with the parameter set and user data in the quantum space. The virtual twin and human are created with the training data provided so that they behave like a real entity. The human and virtual twin can establish a teleportation channel by agreeing on one of the bell states. Since the states of human and virtual twin are superimposed, they can always switch their states. If a virtual twin requires more information, the virtual twin can also switch its state to gather more information from human for better learning and decision making.

The virtual twin presented in this disclosure can also communicate with one or more virtual twins in the quantum space (just like physical human beings in the real world). Because qubits in quantum space are faster, establishing communication between numerous virtual twins in quantum space allows for efficient decision-making. The interactions of multiple virtual twins, combined with the computing capacity of quantum machines, might simulate billions of scenarios in a fraction of the time, guiding humans to the most optimal task strategy. The quantum model (i) validates the state of the virtual twin, (ii) evaluates and optimizes the error between the real human data and the virtual twin data so that the virtual twin behaves similarly to the real human, and (iii) return data to the human to provide suggestions for better decision making if necessary.

Figure 5:
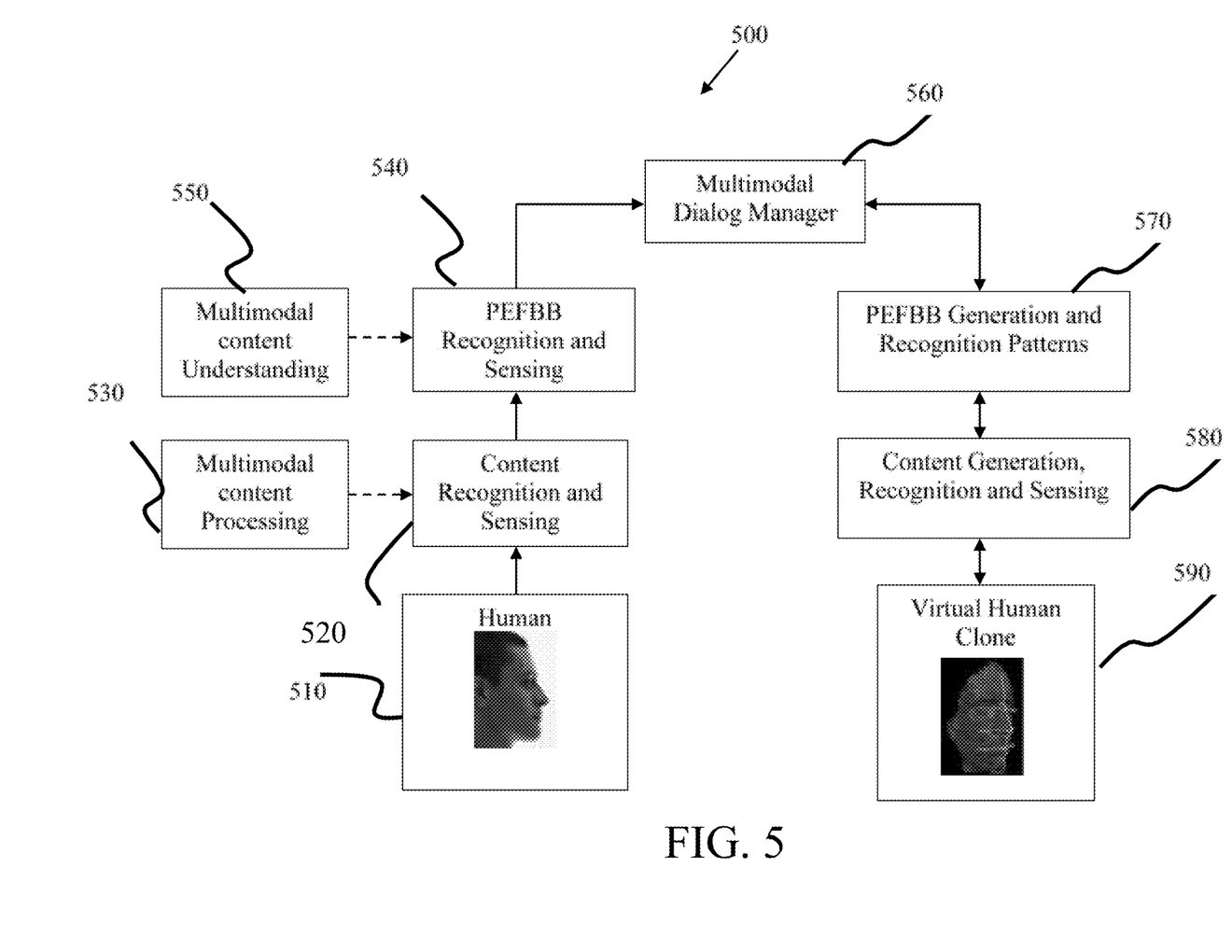
FIG. 5 is a diagram of an example multimodal dialog manager and virtual human clone training system in accordance with embodiments of this disclosure.

FIG. 5 is a diagram of an example multimodal dialog manager and virtual human clone training system 500 in accordance with embodiments of this disclosure. The system 500 pertains to training the multimodal dialog manager and virtual human clone to generate responses to a multimodal query. The responses produced, when a human 510 is involved, are processed to recognize and sense the content 520 present in those response using multimodal content processing 530 techniques. At 540, the characteristics of the recognized content is analyzed for Perception, Emotion, Facial expressions, Body language and Behaviors (PEFBB) (e.g., non-verbal behaviors) recognition and sensed by discovering plurality of semantical, syntactical and structural relationships of the multimodal content that is recognized and sensed at 520. In another embodiment, these nonverbal behaviors are represented using perception markup language (PML), functional markup language (FML), Behavioral Markup Language (BML), Emotion Markup Language (EML) and Body language markup language (BLML). Multimodal content understanding 550 mechanisms provides extraction and representation of PEFBB entities that are used to train the multimodal dialog manager 560. The dialog manager 560 generates and recognizes the PEFBB patterns 570 which are used to generate the actual content to be recognized and sensed 580 in order to provide a meaningful response by virtual human clone 5950 to a user's query. A similar approach is followed to train the virtual human clone 590 and the dialog manager 560 for modeling and adapting the digital twin behavior.

Figure 6:
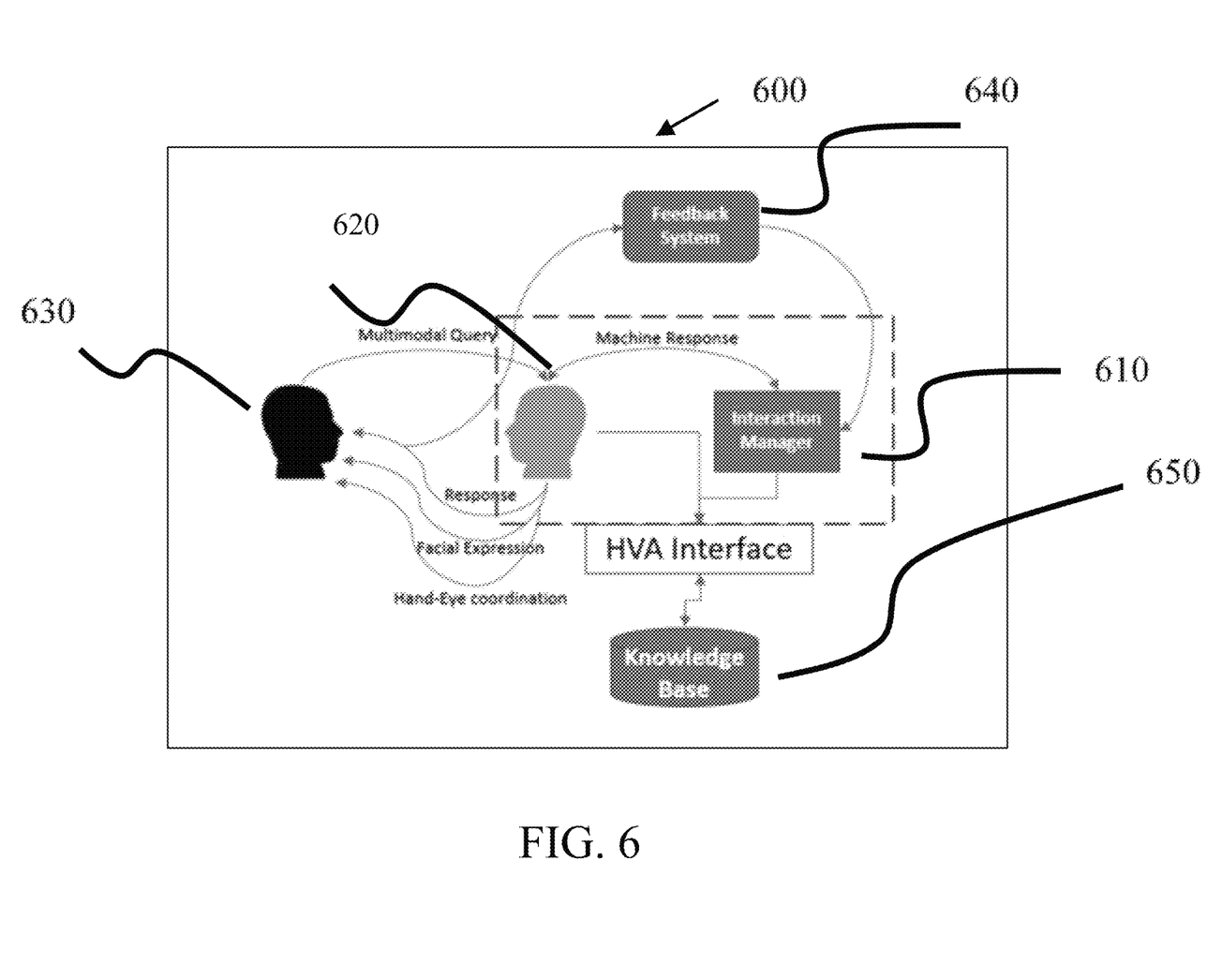
FIG. 6 is a diagram of an example interaction manager in accordance with embodiments of this disclosure.

FIG. 6 is an exemplary method 600 of building an interaction manager 610. The terms interaction manager and dialog manager are interchangeable. For a given multimodal query by a human 630, the virtual human clone 620 provides the response by analyzing the facial expressions, hand-eye coordination, movements of face, eye and lip, etc. with the help of interaction manager 610. The feedback system 640 rewards or punishes for positive and negative responses, respectively, provided by virtual human clone 620. The interactions between human and virtual human clone and the learned patterns by the interaction manager are stored in a knowledge base 650 through Human Virtual Agent (HVA) interface.

The manifestation of a multimodal query 630 considers all natural human traits such as facial expressions, tonal modulations, emotions, speech sarcasm as part of the parameters that make up the query. The human clone 620 comprises of a plurality of functionalities such as query pass through for the interaction manager 610 to identify the intent along with the crux of the query, a query response which is a resultant event of the response from the knowledge base, a transparent query pass through to a human agent where the response is ambiguous or no response is obtained from the knowledge base 650 and provide an expressive response. One of the exemplary methods uses TreeBERT and the custom NLU that identifies human traits. Combined with these, the knowledge base 650 gets supplemented with information from the feedback system 640. The exemplary system 600 picks the emotions and human traits in the form of the following tuple:

$$\{\text{facial expression, tonal modulations, emotion}\}$$

$$\text{Examples are: } \{\text{serious, sad, none}\}, \{\text{jovial, happy, wry smile}\} \quad (1)$$

Figure 6A:
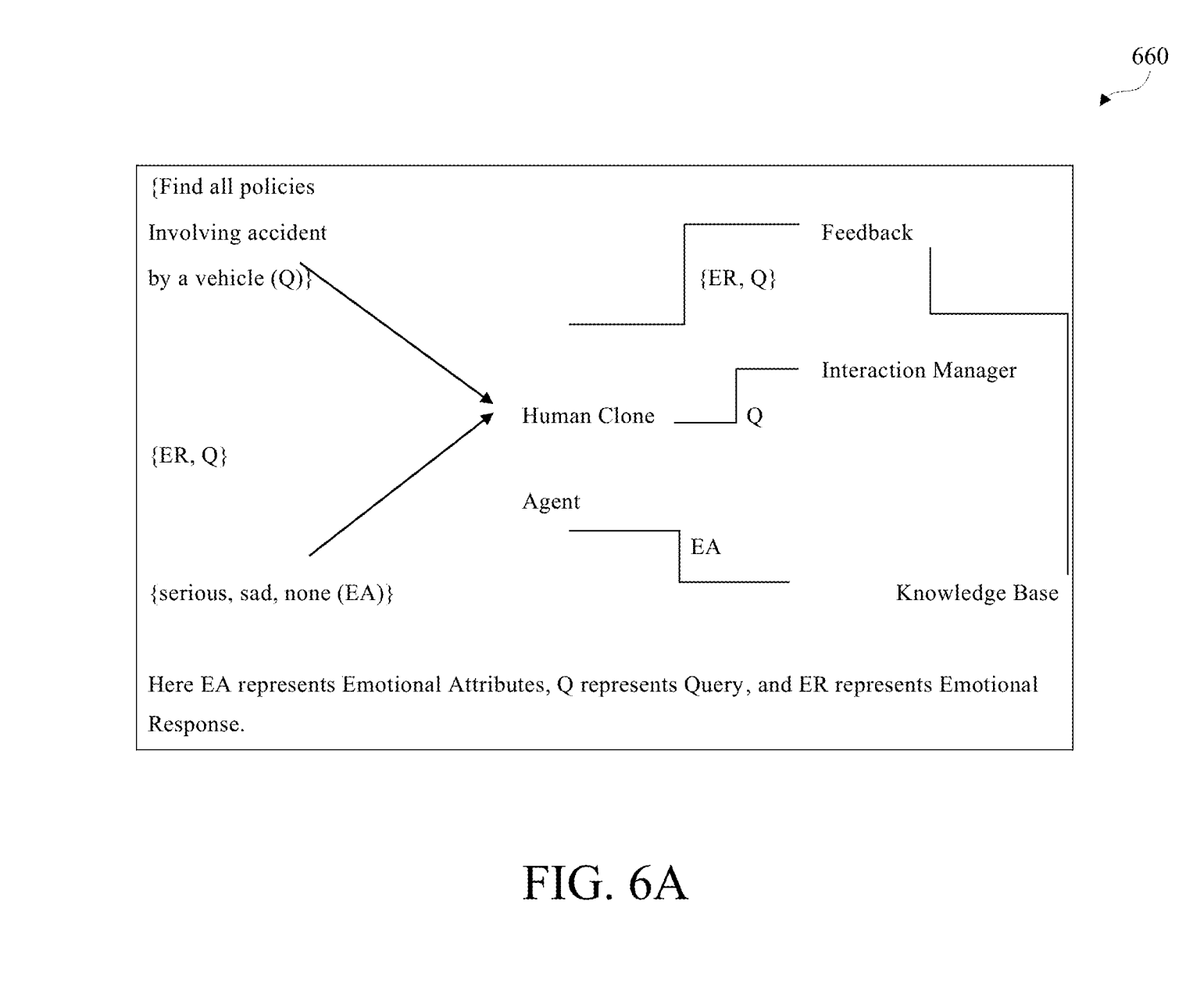
FIG. 6A is a diagram of an example flow of data in accordance with embodiments of this disclosure.

These tuples assist the system 600 to provide results which are closer to the expectations of the individual. The interaction manager 610 has a plurality of functionalities such as query the knowledge base through the HVA interface and filter the results obtained based on the tuples at (1). The knowledge base 650 consists of the documents, their attributes, and the relevant information for retrieval in addition to the required mental states, context, query intent, body language, head and limb movement, and facial expressions. The human clone gathers these attributes from the knowledge base 650 and the results to the query from the interaction manager 610, while providing a response to 630. The feedback system 640 continuously improves the system 600 by taking input on the weakness of the human clone system and the human system itself as the human clone transparently transfers control to the human. The feedback system 640 is a very complex system including one or more voice, verbal and video data, and attributes data attached to human expressions being updated based on the response from 630. A flow 650 of data is shown in FIG. 6A.

Figure 7:
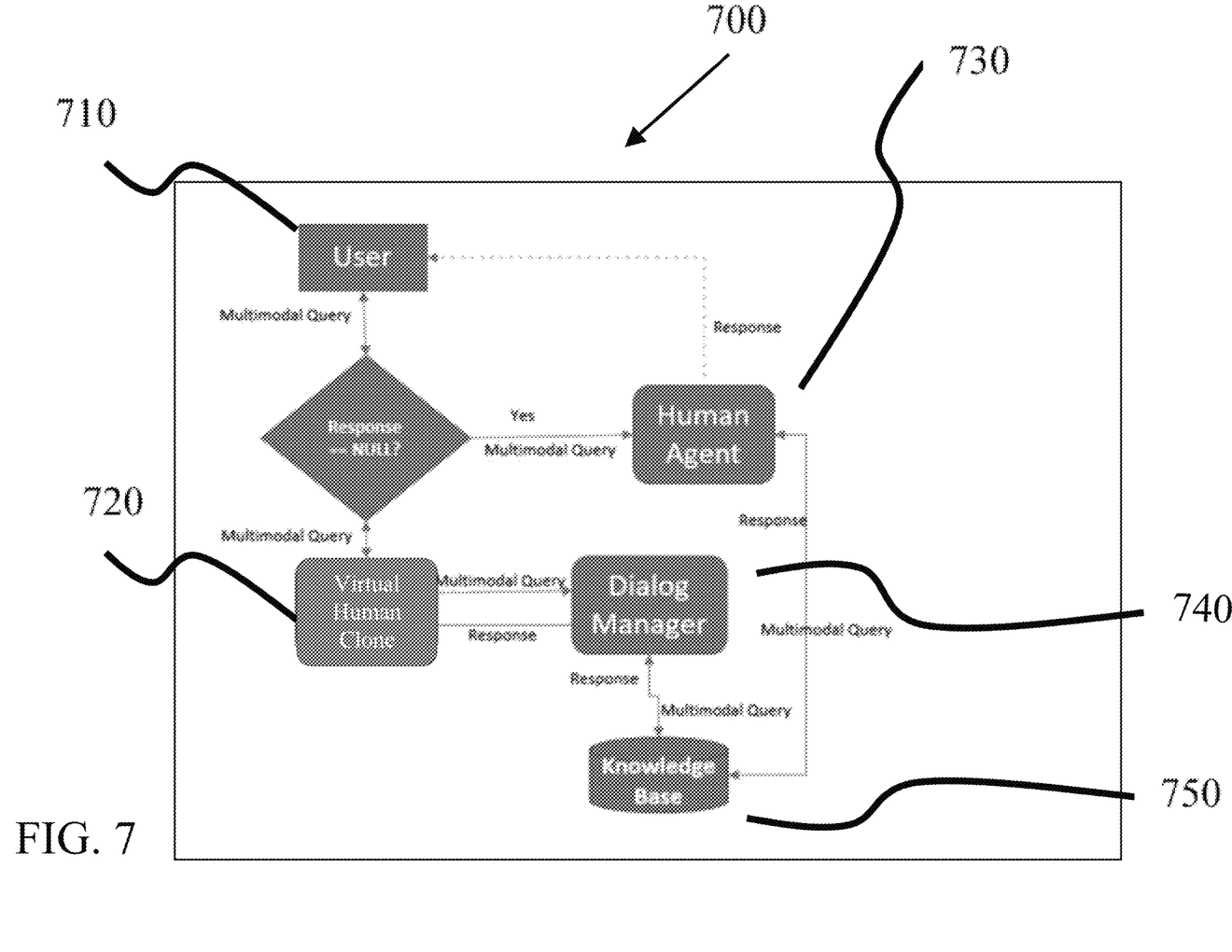
FIG. 7 is a flow diagram of an example transitioning between a human agent and a virtual human clone agent in accordance with embodiments of this disclosure.

FIG. 7 is a flow diagram of an example transitioning method 700 between a human agent 730 and a virtual human clone agent 720 in accordance with embodiments of this disclosure. A dialog manager 740 interacts with the knowledge base 750 to provide an appropriate response by a virtual human clone 720 for a multimodal query given by a user 710. When a response provided by the dialog manager 740 is NULL, the control shifts to the human 730 for providing responses to queries by users 710 in the ongoing conversation. In another embodiment, the exemplary method shifts control back to the virtual human clone 720 once the human agent 730 releases control. The process of transitioning between the virtual human clone 720 and the human agent 730 is completely transparent as the system 700 envisages to present a comprehensive human behavior through the clone agent 720.

The dialog manager 740, analyses the query and the emotional attributes while also breaking down the multimodal query into a machine comprehensible format. This query is presented to the knowledge base 750, and the response in terms of multimodal data is obtained on the extraction of the intent and thus provides an optimal response to the query. The response from the dialog manager 740 to the virtual human clone 720 comprises the emotional response to the query mimicking the exact facial expressions and voice modulations of the human agent 730 being portrayed through the interface. The exemplary system 700 also stores a set of emotional attributes that are fed to the human clone 720 as a response to the emotional attributes presented by 710.

Figure 8:
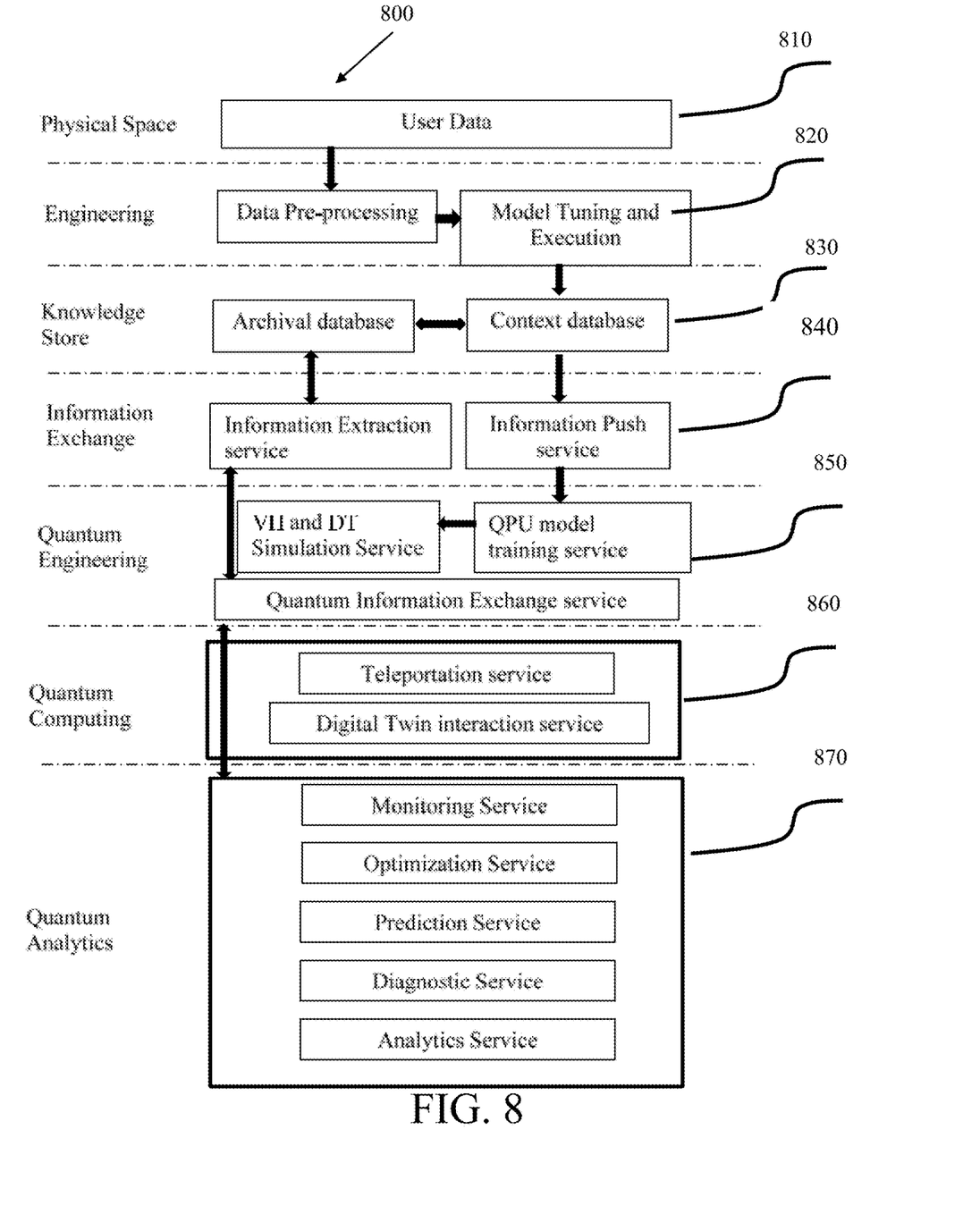
FIG. 8 is a diagram of an example framework for quantum deep transfer learning for manifesting digital twins in accordance with embodiments of this disclosure.

FIG. 8 is an example of an embodied layered framework 800 for the manifestation of a digital twin using quantum deep transfer learning. That is, the digital twin platform is a multi-layer quantum framework for performing quantum teleportation and quantum entanglement as between the digital twins as described herein. The system generalizes the view of basic services and components without depending on any technology. In practice, any relevant technology or framework can be used. The primary "physical space" layer 810 corresponds to the physical user in which the user data such as facial expression, gestures, paralinguistics, etc., is collected. The engineering layer 820 is responsible for data pre-processing such as big data processing and model-related activities (such as model tuning, model training, and execution). A candidate model parameters set is collected in this layer 820 and passed to a knowledge store layer 830. The knowledge store layer 830 maintains two databases. The first database is a contextual database in which the candidate model parameters set along with the training set of the current iteration is stored. The second database is an archival database which stores the archival information related to previous executions. An information exchange layer 840 contains two services responsible for collecting and passing the necessary information from the physical layer 810 to the quantum layer 850. This layer 840 is also responsible for maintaining multiple protocols for information exchange.

The Quantum engineering layer 860 is responsible for reading the information (such as candidate model parameters set) from the physical space. It is responsible for core activities such as creating the Virtual Human and Digital Twin using the Virtual Human and Digital Twin Simulation service. This layer 860 also maintains the Quantum Information Exchange service responsible for communication between the physical space and the quantum space using the protocols defined in the information exchange service. The Quantum computing layer 870 has two services, i.e., teleportation service and digital twin interaction service, responsible for all the teleportation activities and digital twin interactions. The Quantum Analytics layer 880 services are responsible for optimization (for minimizing the error between the real human data and the virtual twin data), prediction (for decision making based on information about future events), application monitoring (for detecting any abnormalities in the data from physical space), analytics, and diagnostics (root cause analysis related to failures). The information from this layer 880 is passed to the physical space via the information exchange layer 840 and the Information Exchange service in the quantum engineering layer 850.

Figure 9:
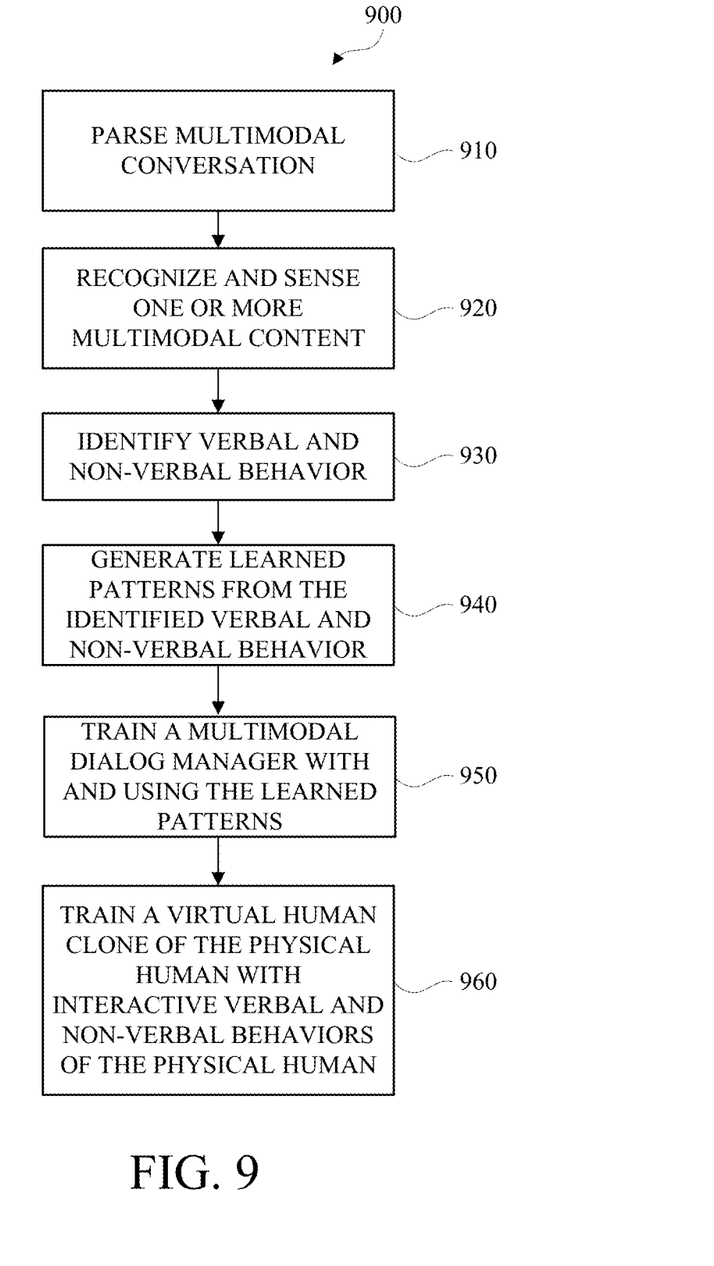
FIG. 9 is a flow chart of an example training method in accordance with embodiments of this disclosure.

FIG. 9 is a flow chart of an example training method 900 in accordance with embodiments of this disclosure as described herein. The method 900 includes parsing 910 multimodal conversation from a physical human for content; recognizing and sensing 920 one or more multimodal content from the parsed content; identifying 930 verbal and non-verbal behavior of the physical human from the one or more multimodal content; generating 940 learned patterns from the identified verbal and non-verbal behavior of the physical human; training 950 a multimodal dialog manager with and using the learned patterns to provide responses to end-user multimodal conversations and queries; and training 960 a virtual human clone of the physical human with interactive verbal and non-verbal behaviors of the physical human, wherein appropriate interactive verbal and non-verbal behaviors are provided by the virtual human clone when providing the responses to the end-user multimodal conversations and queries. Some techniques, such as, parsing are well-known and are not described herein. For example, the method 900 may be implemented, as applicable and appropriate, by the system 050, the system 200, the multimodality interface and processor 305, the virtual human clone 350, the human 360, the digital twin behavior model 400, the multimodal dialog manager and virtual human clone training system 500, the interaction manager 610, the human 630, the virtual human clone 620, the feedback system 640, the human agent 730, the virtual human clone agent 720, and the layered framework 800.

Figure 10:
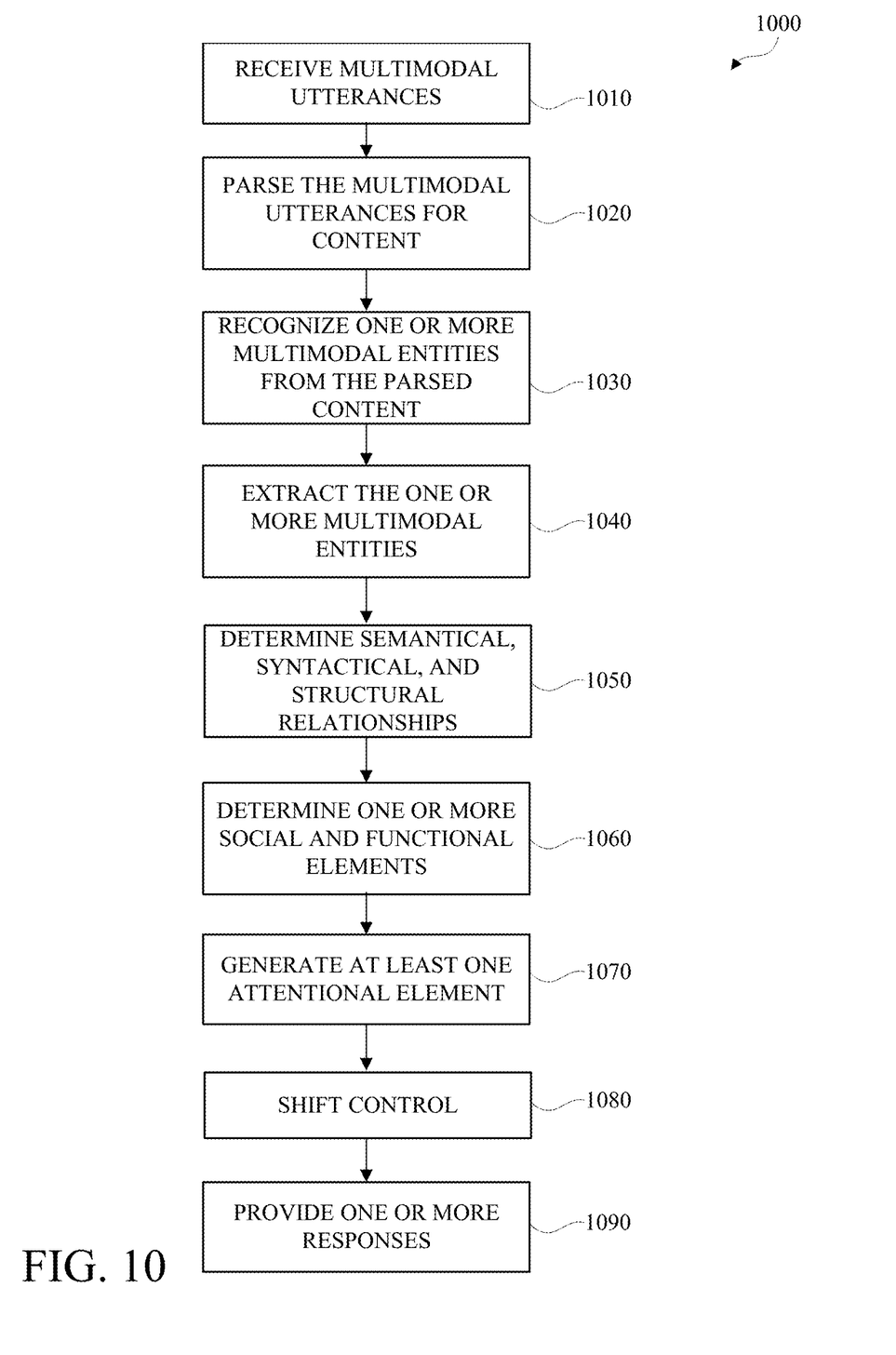
FIG. 10 is a flow chart of an example multimodal conversation in accordance with embodiments of this disclosure.

FIG. 10 is a flow chart of an example method 1000 for multimodal conversation in accordance with embodiments of this disclosure as described herein. The method 1000 includes receiving 1010 multimodal utterances as query input from a user's conversation at a computing device; parsing 1020 the multimodal utterances for content; recognizing 1030 one or more multimodal entities from the parsed content; extracting 1040 the one or more multimodal entities; determining 1050 semantical, syntactical, and structural relationships among the one or more multimodal entities; determining 1060 one or more social and functional elements from the one or more multimodal entities; generating 1070 at least one attentional element from the one or more social and functional elements; shifting 1080 control, when triggered by the at least one attentional element, to one of a virtual human clone agent or a human agent based on an intent of the query input and context of the user's conversation; and providing 1090 one or more responses to the user's conversation by interacting with a knowledge base when responding via the virtual human clone agent or a direct human agent response. Some techniques, such as, parsing are well-known and are not described herein. For example, the method 1000 may be implemented, as applicable and appropriate, by the system 050, the system 200, the multimodality interface and processor 305, the virtual human clone 350, the human 360, the digital twin behavior model 400, the multimodal dialog manager and virtual human clone training system 500, the interaction manager 610, the human 630, the virtual human clone 620, the feedback system 640, the human agent 730, the virtual human clone agent 720, and the layered framework 800.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A method for interactive multimodal conversation, the method comprising:
   receiving multimodal utterances as query input from a user's conversation at a computing device;
   parsing the multimodal utterances for content;
   recognizing one or more multimodal entities from the parsed content;
   extracting the one or more multimodal entities;
   determining semantical, syntactical, and structural relationships among the one or more multimodal entities;
   determining one or more social and functional elements from the one or more multimodal entities;
   generating at least one attentional element from the one or more social and functional elements;
   shifting control, when triggered by the at least one attentional element, to one of a virtual human clone agent or a human agent based on an intent of the query input and context of the user's conversation; and
   providing one or more responses to the user's conversation by interacting with a knowledge base when responding via the virtual human clone agent or a direct human agent response.

2. The method of claim 1, further comprising:
   generating the one or more responses by a dialog manger when the virtual human clone agent is interacting during the interactive multimodal conversation.

3. The method of claim 2, wherein the dialog manager interacts with the knowledge base to form the one or more responses.

4. The method of claim 3, further comprising:
   generating by the emotional, facial expressions, and voice modulations to be used by the virtual human clone agent when responding to mimic the direct human agent.

5. The method of claim 1, further comprising:
   updating the knowledge base based on feedback determined from additional multimodal utterances received during the interactive multimodal conversation in reaction to the one or more responses provided by the dialog manger and the virtual human clone agent.

6. The method of claim 5, wherein the feedback includes at least one of voice, verbal and video data, and attributes data attached to human expressions reactive to the one or more responses.

7. A system for interactive multimodal conversation comprising:
   a multimodal processor configured to:
      receive multimodal utterances as query input from a user's conversation;
      parse the multimodal utterances for content;
      recognize one or more multimodal entities from the parsed content;
      extract the one or more multimodal entities;
      determine semantical, syntactical, and structural relationships among the one or more multimodal entities;
      determine one or more social and functional elements from the one or more multimodal entities;
      generate at least one attentional element from the one or more social and functional elements;
      shift control, when triggered by the at least one attentional element, to one of a virtual human clone agent or a human agent based on an intent of the query input and context of the user's conversation; and
      providing one or more responses to the user's conversation by interacting with a knowledge base when responding via the virtual human clone agent.

8. The system of claim 7, further comprising a dialog manager, the dialog manager configured to generate the one or more responses when the virtual human clone agent is interacting during the interactive multimodal conversation.

9. The system of claim 8, wherein the dialog manager interacts with the knowledge base to form the one or more responses.

10. The system of claim 9, the dialog manager further configured to generate by the emotional, facial expressions, and voice modulations to be used by the virtual human clone agent when responding to mimic the direct human agent.

11. The method of claim 7, the multimodal processor further configured to update the knowledge base based on feedback determined from additional multimodal utterances received during the interactive multimodal conversation in reaction to the one or more responses provided by the dialog manger and the virtual human clone agent.

12. The system of claim 11, wherein the feedback includes at least one of voice, verbal and video data, and attributes data attached to human expressions reactive to the one or more responses.

* * * * *